United States Patent [19]
Larjukhin et al.

[11] 3,828,560
[45] Aug. 13, 1974

[54] SELF-PROPELLED MACHINE WITH A DRIVEN WORK-PERFORMING MEMBER

[76] Inventors: Grigory Artemovich Larjukhin, Mikroraion Serelryanka, 27 kv. 74, Moskovskaya oblasti, poselok Pravda; Valentin Vasilievich Chernyshev, Nikrasovskaya ulitsa, 28, Pushkino Moskovskoi oblasti; Vladislav Iosifovich Nikitin, ulitsa Lesnaya 64, kv. 26, Pushkino Moskovskoi oblasti; Jury Mitrofanovich Serikov, Institutskaya ulitsa, 13, kv. 2, Pushkino Moskovskoi oblasti; Vyacheslav Georgievich Kosinov, Institutskaya ulitsa, 10, kv. 11, Pushkino Moskovskoi oblasti, all of U.S.S.R.

[22] Filed: Mar. 5, 1973

[21] Appl. No.: 338,225

[52] U.S. Cl. ............ 60/709, 74/665 GE, 74/665 H, 74/665 T
[51] Int. Cl. ............................................. B62d 55/00
[58] Field of Search ............ 60/403, 698, 706, 709, 60/6, 11, 12, 14, 19; 74/665 GE, 665 H, 665 T

[56] References Cited
UNITED STATES PATENTS
3,104,528   9/1963   Horig ........................................ 60/6

*Primary Examiner*—Edgar W. Geoghegan
*Assistant Examiner*—Allen M. Ostrager
*Attorney, Agent, or Firm*—Holman & Stern

[57] ABSTRACT

A self-propelled machine with a driven work-performing member includes a prime mover rotating the work-performing member through a transmission including a torque-limiting safety clutch of which the driven part is positively connected with the shaft of a liquid pump. The chassis of the machine is driven by a hydraulic motor communicating via a supply conduit with this liquid pump. If the work-performing member should get jammed in operation, the shaft of the liquid pump discontinues its rotation, whereby the supply of the working liquid under pressure to the hydraulic motor is also discontinued, and the machine is brought to a halt.

2 Claims, 2 Drawing Figures

SELF-PROPELLED MACHINE WITH A DRIVEN WORK-PERFORMING MEMBER

BACKGROUND OF THE INVENTION

The present invention relates to self-propelled machines with a driven work-performing member.

The present invention can be used to utmost advantage in agriculture, e.g. when constructing planting terraces arranged on the slopes of hills and mountains, in road-building, in digging trenches and canals, in the mining industry.

Various machines are known in the art including a driven work-performing member. In these machines the work-performing member receives its drive from the prime-mover of the chassis of the machine through a mechanical transmission. The propelling system of the chassis is also driven by the same prime mover.

In some of these known machines, the driving system of the work-performing member includes a torque-limiting safety overload clutch to protect the work-performing member and its transmission from damage and even breakdowns.

There are also known self-propelled machines including a driven work-performing member, wherein the chassis of the machine is driven by a hydraulic motor supplied with pressurized working liquid from a liquid pump directly associated with the prime mover of the machine.

In operation of the machines of the last-mentioned kind, the work-performing member thereof is driven through a mechanical transmission, while the machine, as a whole, is propelled by the above-specified hydraulic transmission.

However, practical experience has shown that the breakdown preventing system incorporated in these machines is inadequately effective. When the motion of the work-performing member is unduly opposed (i.e. when the work-performing member gets "jammed"), the safety clutch operates, and the work-performing member is arrested, whereas the machine continues its progress. If the operator should fail to disable the drive of the chassis of the machine in due time, the machine itself might be damaged, or even broken. Therefore, the operator of a machine of this kind must be permanently on the alert, i.e. he must be prepared to halt the machine very promptly to prevent it from being damaged. This situation becomes particularly dramatic, when the machine is operated on the slope of a hill or of a mountain, where even a slight mistake on the operator's part might result in the machine overturning.

There is further known a self-propelled machine with a driven work-performing member, wherein the drive of the work-performing member and that of the chassis are interconnected by means of a distributor gearbox. The transmission of the machine includes a hydraulic torque converter connecting the prime mover with the distribution box, i.e. rotation is transmitted from the shaft of the prime mover to this torque converter, and the latter transmits it to the distributor box. From the distributor box rotation is transmitted both to the work-performing member and to the chassis. In operation, a machine of this kind automatically increases or reduces the speed of its progress, depending on the actual load of the work-performing member.

If the work-performing member of a machine of the last-described kind should get jammed in operation, the machine is halted, whereas the torque converter continues its rotation, which results in rapid heating up of the working liquid in the torque converter and in excessive wear of its components. Consequently, the machine has to incorporate a complicated and costly system for cooling the torque converter. When the working liquid becomes overheated, the machine is to be stopped for a certain period, which affects its productivity. Furthermore, the last-described arrangement of the transmission to the drive of the work-performing member and to the chassis of the machine does not eliminate the necessity for the operator to swiftly disengage the prime mover from the transmission in case of overloads.

SUMMARY OF THE INVENTION

It is an object of the present invention to provide a self-propelled machine with a driven work-performing member, which will have a structure providing for increased productivity of the machine and prolonged service life thereof.

It is another object of the present invention to provide a self-propelled machine with a driven work-performing member, in which the task of the operator will be considerably simplified.

These and other objects are accomplished by that in a self-propelled machine with a driven work-performing member, comprising a prime mover, a transmission connecting the work-performing member with the prime mover, including a torque-limiting safety clutch adapted to disconnect the work-performing member from the prime mover at overloads, the driving part of the safety clutch being positively connected with the shaft of the prime mover and the driven part thereof being positively connected with the work-performing member, the machine further including a self-propelled chassis including a driving hydraulic motor receiving the driving effort from a liquid pump, in which machine, in accordance with the present invention, the shaft of the liquid pump is positively connected to the driven part of the safety clutch, whereby, if the work-performing member should get jammed in operation, the driven part of the safety clutch will stop, the shaft of the liquid pump discontinuing its rotation and, consequently, discontinuing the supply of the pressurized working liquid to the hydraulic motor of the drive of the chassis, bringing the machine to a halt.

According to one of the embodiments of the invention, the machine further includes an additional liquid pump driven for rotation from the shaft of the prime mover and connected to the hydraulic motor in parallel with the liquid pump receiving rotation through the driven part of the safety clutch.

The incorporation of this additional liquid pump enables to continue the progress of the chassis of the machine, at operator's will, when the work-performing member has its motion obstructed by an unsurpassable obstacle.

The present invention provides for reliable protection of the machine against breakdowns and damage at overloads of its work-performing member, which, in its turn, results in increased productivity of the machine and prolonged service life thereof.

Moreover, the herein disclosed self-propelled machine with a driven work-performing member considerably simplifies the task of its operator. The system protecting the machine from damage at overloads of its work-performing member is characterized by simplicity of its manufacture and ease of its operation, as well as by reliability of its performance; it may incorporate relatively simple and inexpensive component parts.

BRIEF DESCRIPTION OF THE DRAWING

These and other objects and advantages of the present invention will become apparent from the following detailed description of an embodiment thereof, with reference being had to the accompanying drawings, wheren.

DETAILED DESCRIPTION OF THE PREFERRED EMBODIMENT

Figure 1:
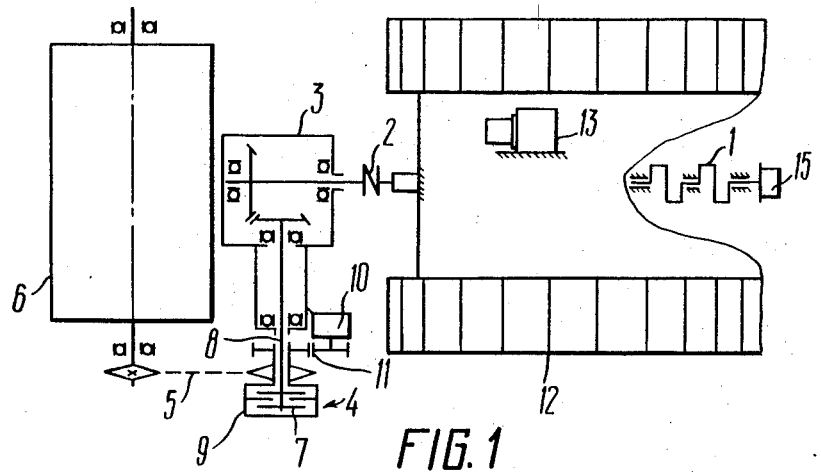
FIG. 1 is a schematic plan view and the drive diagram of a self-propelled machine with a driven work-performing member, embodying the invention.

Referring now in particular to the appended drawings, the self-propelled machine with a drive work-performing member (FIGS. 1 and 2) includes a prime mover 1, e.g. an internal combustion engine, having the shaft thereof connected through a clutch 2, a bevel gear reducer 3, a torque-limiting safety clutch 4 and a driving chain 5 to the work-performing member 6. The work-performing member 6 may acquire different forms, depending on the application of the machine, e.g. it may be a rotary cutter, a rotary wheel, an endless chain, etc. The torque-limiting safety clutch 4 includes a driving part 7 rigidly mounted on the output shaft 8 of the bevel gear reducer 3, and a driven part 9 connected through the driving chain 5 to the work-performing member 6. The driven part 9 of the safety clutch 4 is further connected to the shaft of a liquid pump 10 through a gear couple 11. The chassis 12 of the machine is driven by a hydraulic motor 13 communicating via a supply conduit 14 with the liquid pump 10. The chassis 12 of the machine may have various propelling means, such as endless tracks, wheels, etc. In the herein disclosed embodiment, the chassis 12 of the machine includes endless tracks.

The herein disclosed machine further includes an additional liquid pump 15 of which the shaft is rotatable directly from the prime mover 1. The liquid pump 15 is connected to the hydraulic motor 13 in parallel with the above-mentioned liquid pump 10, via the supply conduit 14.

The hydraulic system of the machine further includes liquid distributor valves 16 and 17, an adjustable throttle valve 18 and an oil reservoir 19 associated with an oil filter 20.

Figure 2:
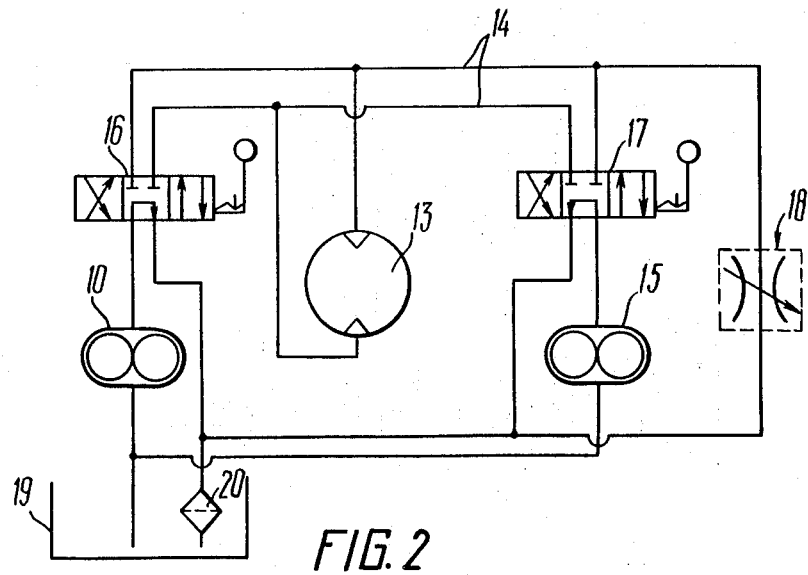
FIG. 2 is the diagram of the hydraulic drive system of the machine illustrated in FIG. 1.

The herein disclosed self-propelled machine with a driven work-performing member, illustrated in FIGS. 1 and 2, operates, as follows.

The prime mover 1 transmits rotation through the clutch 2, the reducer 3, the safety clutch 4 and the driving chain 5 to the work-performing member 6. Simultaneously, the driven part 9 of the safety clutch 4 transmits rotation through the gear couple 11 to the shaft of the liquid pump 10. The oil from the oil reservoir 19 is pumped by the liquid pump 10 through the distributor valve 16 in its "on" position via the supply conduit 14 into the hydraulic motor 13, in which way the shaft of the latter is rotated. The shaft of the hydraulic motor 13 is operatively connected with the drive transmission of the chassis 12, in which way the latter receives its driving torque. When the prime mover 1 is started, the liquid pump 15 is also rotated. With the valve member of the distributor valve 17 being set to a neutral position, the oil pumped by the liquid pump 15 from the reservoir 19 flows through the distributor valve 17 through the oil filter 20 back into the reservoir 19.

When the work-performing member 6 meets a serious obstacle, its motion is unduly obstructed (the work-performing member 6 gets jammed). The driven part 9 of the torque-limiting safety clutch 4 being positively connected with the work-performing member 6, the rotation of this driven part 9 stops, and consequently, the rotation of the shaft of the liquid pump 10 is also discontinued. Therefore, no more pressurized oil is supplied from the liquid pump 10 into the hydraulic motor 13, whereby the progress of the machine is halted.

However, when the work-performing member 6 in operation is loaded so that the torque-limiting safety clutch 4 is but partly disengaged, the driven part 9 of the latter has its angular speed reduced. The driven part 9 being connected with the liquid pump 10, the shaft of the latter in this case also has its angular speed reduced, whereby the liquid pump 10 supplies less pressurized oil to the hydraulic motor 13, and the shaft of the latter rotates at a reduced angular speed. Consequently, the speed of the progress of the machine is reduced accordingly.

The liquid pump 10 in a machine constructed in accordance with the present invention may be in the form of a variable-capacity pump, which makes it possible to ensure more uniform control of the supply of the pressurized oil into the hydraulic motor 13 from the liquid pump 10, depending on the load applied to the work-performing member 6, which, in its turn, opens way to automatic selection of the mode of operation of the machine in accordance with the actual loading of the work-performing member 6.

The operator is able, when it is necessary, to connect the drive of the chassis of the machine to the additional liquid pump 15, when the work-performing member 6 gets jammed. In this case the valve member of the distributor valve 16 is set to a neutral position, and that of the distributor valve 17 — to an "on" position, and the oil from reservoir 19 is supplied by the liquid pump 15 via the supply conduit 14 to the hydraulic motor 13, in which way the chassis of the machine is driven to move the machine from the position in which the work-performing member 6 has been jammed. The work-performing member 6 released, the drive of the chassis of the machine is re-connected to the liquid pump 10 by setting the distributor valve 17 to the neutral position, and the distributor valve 16 — to the "on" position.

In order to provide smooth control of the speed of the progress of the machine in operation, the hydraulic system of the machine incorporates an adjustable throttle valve 18. When it is required to vary the speed of the machine to correspond to the loading of the work-performing member, a part of the oil supplied by the liquid pump 10 to the hydraulic motor 13 may be by-passed through this adjustable throttle valve 18. The amount of the pressurized oil supplied to the hydraulic motor 13 being in this case reduced, the angular speed of the output shaft of this motor is reduced accordingly, whereby the progress of the machine is slowed down.

What is claimed is:

1. A self-propelled machine with a work-performing member actuated by a prime mover of the machine, comprising: a drive transmission of said work-performing member including a torque-limiting safety clutch adapted to disconnect said work-performing member from said prime mover, at overloading of said work-performing member, said safety clutch incorporating a drive part and a driven part, said driving part being positively connected to the shaft of said prime mover, said driven part being connected with the shaft of said work-performing member; a liquid pump having a shaft thereof positively connected to said driven part of said safety clutch; a chassis; a hydraulic motor in the drive of said chassis, adapted to be actuated from said liquid pump; whereby, if said work-performing member should get jammed in operation, said driven part of said clutch is stopped, said shaft of said liquid pump discontinuing its rotation, and said machine halting.

2. A self-propelled machine as claimed in claim 1, further comprising an additional liquid pump receiving rotation from said shaft of said prime mover and connected to said hydraulic motor in parallel with said liquid pump receiving rotation from said driven part of said torque-limiting safety clutch.

* * * * *